United States Patent

Babb

Patent Number: 5,933,076
Date of Patent: Aug. 3, 1999

[54] RETROFITTABLE BICYCLE TURN INDICATOR

[76] Inventor: Montrose Babb, 135 Sunderland Road, Forest Hill, London, United Kingdom, SE23 2PX

[21] Appl. No.: 09/048,675

[22] Filed: Mar. 26, 1998

[51] Int. Cl.[6] .................................................. B60Q 1/34
[52] U.S. Cl. .................. 340/475; 340/432; 340/465; 340/471; 200/61.27; 315/200 A; 362/473
[58] Field of Search .................................. 340/475, 432, 340/471, 465, 468, 473, 472; 200/61.27; 315/200 A; 362/473, 418

[56] References Cited

U.S. PATENT DOCUMENTS

| | | | |
|---|---|---|---|
| D. 354,822 | 1/1995 | Bledsoe | D26/28 |
| 4,099,222 | 7/1978 | Cornell et al. | 340/432 |
| 4,204,191 | 5/1980 | Daniels | 340/432 |
| 4,760,372 | 7/1988 | Watson | 340/432 |
| 4,896,138 | 1/1990 | Nickols | 340/479 |
| 5,247,431 | 9/1993 | Liu | 362/72 |
| 5,264,826 | 11/1993 | Henderson et al. | 340/471 |
| 5,418,696 | 5/1995 | Izzo, Sr. | 340/468 |
| 5,595,441 | 1/1997 | McGee | 340/432 |
| 5,617,303 | 4/1997 | Izzo, Sr. | 340/432 |

*Primary Examiner*—Nina Tong

[57] ABSTRACT

A bicycle turn signal system is provided including at least one turn light assembly including a rod. A couple is mounted to a central extent of the rod for being removably connected to a bicycle. A pair of bulbs are situated at ends of the rod. A pair of turn light switch units are each mounted on handle bars of the bicycle. The turn light switch units include a momentary push button switch. The turn light switch units comprise a left turn light switch unit mounted on a left side the handle bars adjacent to a left grip. A right turn light switch unit is mounted on a right side of handle bars adjacent to a right grip. A control compartment includes a pair of flashers each connected in series with at least one associated bulb, one of the momentary switches and a power source.

9 Claims, 2 Drawing Sheets

RETROFITTABLE BICYCLE TURN INDICATOR

BACKGROUND OF THE INVENTION

1. Field of the Invention

The present invention relates to toggle-switched bicycle turn indicators and more particularly pertains to a new retrofittable bicycle turn indicator for effecting the signaling of a turn by a bicyclist via one of a pair of momentary switches.

2. Description of the Prior Art

The use of toggle-switched bicycle turn indicators is known in the prior art. More specifically, toggle-switched bicycle turn indicators heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle turn indicators include U.S. Pat. No. 5,418,696; U.S. Pat. No. 5,247,431; U.S. Pat. No. 4,099,222; U.S. Pat. No. 5,264,826; U.S. Pat. No. 4,896,138; and U.S. Pat. Des. No. 354,822.

In these respects, the retrofittable bicycle turn indicator according to the present invention substantially departs from the conventional concepts and designs of the prior art, and in so doing provides an apparatus primarily developed for the purpose of effecting the signaling of a turn by a bicyclist via one of a pair of momentary switches.

SUMMARY OF THE INVENTION

In view of the foregoing disadvantages inherent in the known types of toggle-switched bicycle turn indicators now present in the prior art, the present invention provides a new retrofittable bicycle turn indicator construction wherein the same can be utilized for effecting the signaling of a turn by a bicyclist via one of a pair of momentary switches.

The general purpose of the present invention, which will be described subsequently in greater detail, is to provide a new retrofittable bicycle turn indicator apparatus and method which has many of the advantages of the toggle-switched bicycle turn indicators mentioned heretofore and many novel features that result in a new retrofittable bicycle turn indicator which is not anticipated, rendered obvious, suggested, or even implied by any of the prior art toggle-switched bicycle turn indicators, either alone or in any combination thereof.

To attain this, the present invention generally comprises a pair of turn light assemblies each having a linear hollow cylindrical rod. A pair of resilient clamp portions each defined by a portion of a vertically oriented cylinder are mounted to a central extent of the rod. Note FIG. 1. A pair of hollow disk shaped mounts each have a periphery coupled to ends of the rod. As such, the mounts reside in a common vertical plane. A circular face of each mount is equipped with a central aperture and a pair of diametrically opposed threaded bores formed therein. Each turn light assembly further includes a pair of transparent hemispherical domes each having a pair of conduits formed on diametrically opposed sides. By this structure, the domes are each mounted to the circular face of a respective one of the mounts via screws. Such screws are situated through the conduits and secured to the threaded apertures for defining an interior space. Note FIG. 3. A pair of bulbs are each mounted within the central aperture of the corresponding mount. Wires are coupled to the bulbs and extend through the rod and exit from the central extent thereof opposite the clamp portions. As shown in FIG. 1, the turn light assemblies include a front turn light assembly. The clamp portions of such light are mounted to a vertically oriented central handle bar post of a bicycle. As such, the bulbs face forward. Associated therewith is a rear turn light assembly with the clamp portions thereof mounted to a seat post such that the bulbs face rearward. Next provided is a pair of turn light switch units each defined by a portion of a hollow cylinder. A slit is formed in the hollow cylinder for allowing the turn switch units to be mounted on a horizontal portion of the handle bars of the bicycle. The turn light switch units further include a momentary push button switch mounted thereon on a side opposite the slit. As shown in FIG. 1, the turn light switch units comprise a left turn light switch unit mounted on a left side of the horizontal portion of the handle bars. In such orientation, the left turn light switch unit remains adjacent to a left grip and is accessible by a thumb of a user. The turn light switch units further include a right turn light switch unit mounted on a right side of the horizontal portion of the handle bars adjacent to a right grip. For powering purposes, a generator is included having a pair of resilient clamp portions situated thereon. The clamp portions of the generator are adapted for allowing the same to be mounted to the bicycle adjacent to a tire thereof. As such, the generator is positioned for generating an alternating current upon the rotation of the tire. Lastly, a control compartment is included having a pair of resilient clamp portions mounted to the bicycle. The control compartment includes a bridge rectifier situated therein which is connected in parallel with the generator and a battery that is also situated within the control compartment. It should be noted that a diode is connected between the rectifier and battery to ensure the proper flow of power. The control compartment further includes a pair of flashers each connected in series with an associated pair of the bulbs, momentary switch and the power source.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new retrofittable bicycle turn indicator apparatus and method which has many of the advantages of the toggle-switched bicycle turn indicators mentioned heretofore and many novel features that result in a new retrofittable bicycle turn indicator which is not anticipated, rendered obvious, suggested, or even implied by any of the prior art toggle-switched bicycle turn indicators, either alone or in any combination thereof.

It is another object of the present invention to provide a new retrofittable bicycle turn indicator which may be easily and efficiently manufactured and marketed.

It is a further object of the present invention to provide a new retrofittable bicycle turn indicator which is of a durable and reliable construction.

An even further object of the present invention is to provide a new retrofittable bicycle turn indicator which is susceptible of a low cost of manufacture with regard to both materials and labor, and which accordingly is then susceptible of low prices of sale to the consuming public, thereby making such retrofittable bicycle turn indicator economically available to the buying public.

Still yet another object of the present invention is to provide a new retrofittable bicycle turn indicator which provides in the apparatuses and methods of the prior art some of the advantages thereof, while simultaneously overcoming some of the disadvantages normally associated therewith.

Still another object of the present invention is to provide a new retrofittable bicycle turn indicator for effecting the signaling of a turn by a bicyclist via one of a pair of momentary switches.

Even still another object of the present invention is to provide a new retrofittable bicycle turn indicator that includes at least one turn light assembly including a rod. A couple is mounted to a central extent of the rod for being removably connected to a bicycle. A pair of bulbs are situated at ends of the rod. A pair of turn light switch units are each mounted on handle bars of the bicycle. The turn light switch units include a momentary push button switch. The turn light switch units comprise a left turn light switch unit mounted on a left side the handle bars adjacent to a left grip. A right turn light switch unit is mounted on a right side of handle bars adjacent to a right grip. A control compartment includes a pair of flashers each connected in series with at least one associated bulb, one of the momentary switches and a power source.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
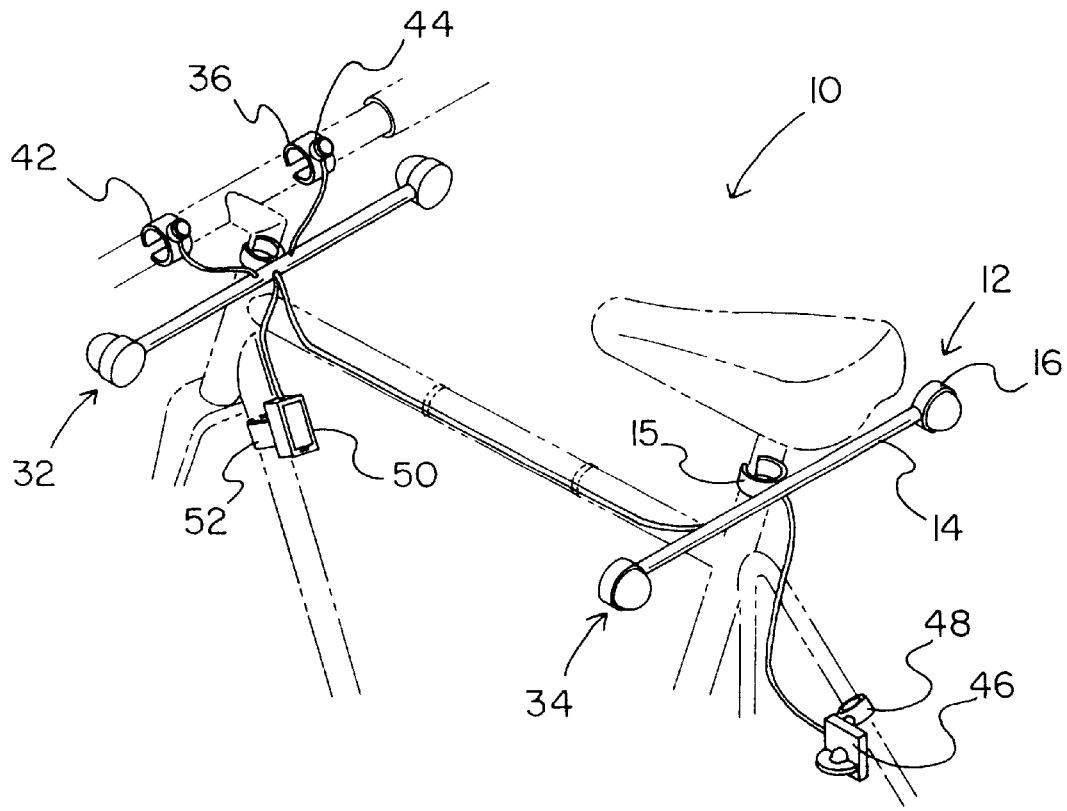
FIG. 1 is a perspective view of a new retrofittable bicycle turn indicator according to the present invention during use.

With reference now to the drawings, and in particular to FIGS. 1 through 4 thereof, a new retrofittable bicycle turn indicator embodying the principles and concepts of the present invention and generally designated by the reference numeral 10 will be described.

The present invention, designated as numeral 10, includes a pair of turn light assemblies 12 each having a linear hollow cylindrical rod 14. A pair of resilient clamp portions 15 each defined by a portion of a vertically oriented cylinder are mounted to a central extent of the rod. Note FIG. 1. A pair of hollow disk shaped mounts 16 each have a periphery coupled to one of the ends of the rod. As such, the mounts reside in a common vertical plane. A circular face of each mount is equipped with a central aperture 18 and a pair of diametrically opposed threaded bores 20 formed therein.

The resilient clamp portions 15 of the rod of the turn light assemblies thus allow the removable coupling of the turn light assemblies to the bicycle. It should be noted, however, that the rods may be securely locked or integrally coupled to the bicycle in the alternative. As such, all wiring and mounting of the present invention may be incorporated at the time of manufacture of the bicycle.

Each turn light assembly further includes a pair of transparent hemispherical domes 22 each having a pair of conduits 24 formed on diametrically opposed sides. By this structure, the domes are each mounted to the circular face of a respective one of the mounts via screws 26. Such screws are situated through the conduits and secured to the threaded apertures for defining an interior space. Note FIG. 3. A pair of bulbs 28 are each mounted within the central aperture of the corresponding mount. Wires 30 are coupled to the bulbs and extend through the rod and exit from the central extent thereof opposite the clamp portions.

As shown in FIG. 1, the turn light assemblies include a front turn light assembly 32. The clamp portions of such turn light assembly are mounted to a vertically oriented central handle bar post of a bicycle. As such, the bulbs face forward. Associated therewith is a rear turn light assembly 34 with the clamp portions thereof mounted to a seat post such that the bulbs face rearward.

Next provided is a pair of turn light switch units 36 each defined by a portion of a hollow cylinder. A slit 38 is formed in the hollow cylinder for allowing the turn switch units to be mounted on a horizontal portion of the handle bars of the bicycle. The turn light switch units further include a momentary push button 40 switch mounted thereon on a side opposite the slit.

As shown in FIG. 1, the turn light switch units comprise a left turn light switch unit 42 mounted on a left side of the horizontal portion of the handle bars. In such orientation, the left turn light switch unit remains adjacent to a left grip and is accessible by a thumb of a user. The turn light switch units further include a right turn light switch unit 44 mounted on a right side of the horizontal portion of the handle bars adjacent to a right grip.

For powering purposes, a generator 46 is included having a pair of resilient clamp portions 48 situated thereon. The clamp portions of the generator are adapted for allowing the same to be mounted to the bicycle adjacent to a tire thereof. As such, the generator is positioned for generating an alternating current upon the rotation of the tire.

Figure 2:
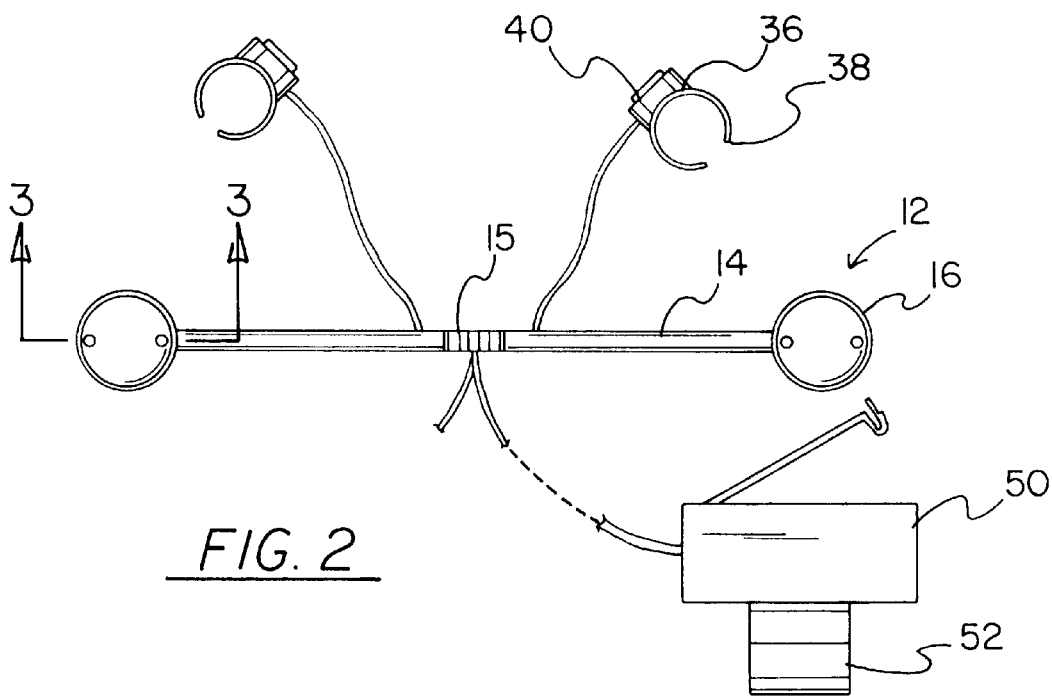
FIG. 2 is a perspective view of the present invention.
Figure 3:
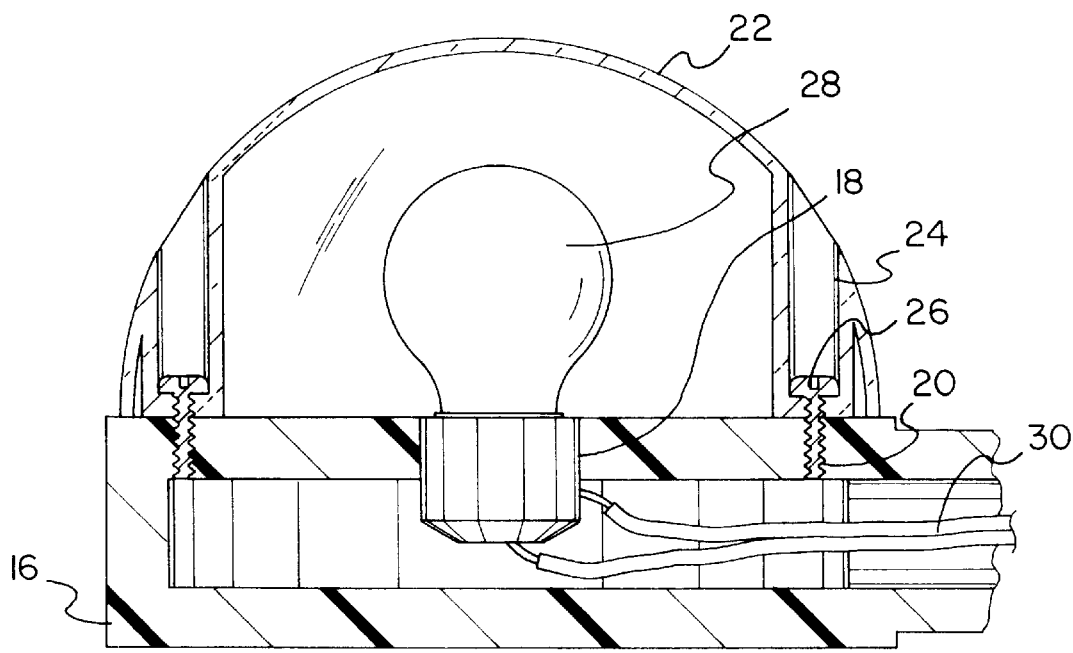
FIG. 3 is a cross-sectional view of the present invention taken along line 3—3 shown in FIG. 2.

Lastly, a control compartment 50 is included having a pair of resilient clamp portions 52 mounted to the bicycle. The control compartment includes a bridge rectifier 54 situated therein which is connected in parallel with the generator and a battery that is also situated within the control compartment. It should be noted that a diode 56 is connected between the rectifier and battery to ensure the proper flow of power. The control compartment further includes a pair of flashers 58 each connected in series with an associated pair of the bulbs, momentary switch and the power source. The control compartment, as shown in FIG. 2, has a lid for allowing replacement of the batteries.

Figure 4:
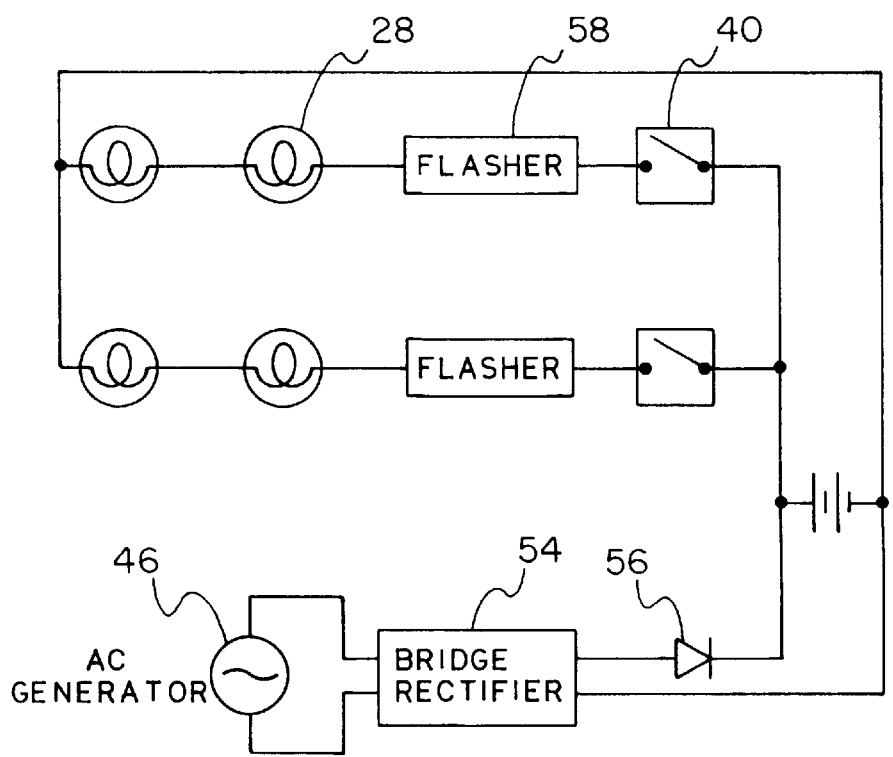
FIG. 4 is a schematic diagram of the present invention.

As shown in FIG. 4, the bulbs, flashers and momentary switches each define a pair of series subnetworks connected in parallel to define a macronetwork that is connected in series with the power source. Each subnetwork only includes components related to the right or left switches and bulbs. It should be noted that each component of the present invention may be installed as a retrofittable item or at time of manufacture.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bicycle turn signal system comprising, in combination:

a pair of turn light assemblies each including a linear hollow cylindrical rod, a pair of resilient clamp portions each defined by a portion of a vertically oriented cylinder and mounted to a central extent of the rod, a pair of hollow disk shaped mounts each having a periphery coupled to ends of the rod such that the mounts reside in a common vertical plane and a circular face with a central aperture and a pair of diametrically opposed threaded bores formed therein, a pair of transparent hemispherical domes each having a pair of conduits formed on diametrically opposed sides thereof whereby the domes are each mounted to the circular face of a respective one of the mounts via screws situated through the conduits and secured to the threaded apertures for defining an interior space, and a pair of bulbs each mounted within the central aperture of the corresponding mount and having wires coupled thereto which extend through the rod and exit from the central extent thereof opposite the clamp portions;

said turn light assemblies including a front turn light assembly with the clamp portions thereof mounted to a central vertically oriented handle bar post of a bicycle such that the bulbs face forward and a rear turn light assembly with the clamp portions thereof mounted to a seat post such that the bulbs face rearward;

a pair of turn light switch units each defined by a portion of a hollow cylinder with a slit formed therein for allowing the turn switch units to be mounted on a horizontal portion of the handle bars of the bicycle, the turn light switch units further including a momentary push button switch mounted thereon on a side opposite the slit;

said turn light switch units comprising a left turn light switch unit mounted on a left side of the horizontal portion of the handle bars adjacent to a left grip and a right turn light switch unit mounted on a right side of the horizontal portion of the handle bars adjacent to a right grip;

a generator having a pair of resilient clamp portions situated thereon for being mounted to the bicycle adjacent to a tire thereof for generating an alternating current upon the rotation thereof; and a control compartment having a pair of resilient clamp portions mounted to the bicycle, the control compartment including a bridge rectifier situated therein and connected in parallel with the generator and a battery also situated within the control compartment wherein a diode is connected therebetween to provide a power source, the control compartment further including a pair of flashers each connected in series with an associated pair of the bulbs, momentary switch and the power source.

2. A bicycle turn signal system comprising:

at least one turn light assembly including a rod, a coupling means mounted to a central extent of the rod for being connected to a bicycle, and a pair of bulbs each situated at ends of the rod;

a pair of turn light switch units each mounted on handle bars of the bicycle, the turn light switch units each including a momentary push button switch;

said turn light switch units comprising a left turn light switch unit mounted on a left side the handle bars adjacent to a left grip and a right turn light switch unit mounted on a right side of the handle bars adjacent to a right grip;

a power source;

a control compartment mounted to the bicycle, the control compartment including a pair of flashers each connected in series with at least one associated bulb, one of the momentary switches and the power source;

wherein the turn light assemblies each include a pair of hollow disk shaped mounts each having a periphery coupled to ends of the rod such that the mounts reside in a common vertical plane and a circular face with a central aperture and a pair of diametrically opposed threaded bores formed therein, a pair of transparent hemispherical domes each having a pair of conduits formed on diametrically opposed sides thereof whereby the domes are each mounted to the circular face of a respective one of the mounts via screws situated through the conduits and secured to the threaded apertures for defining an interior space in which the bulbs are mounted.

3. A bicycle turn signal system as set forth in claim 2 wherein the power source includes a generator mounted to the bicycle adjacent to a tire thereof for generating an alternating current upon the rotation thereof and further included is a bridge rectifier.

4. A bicycle turn signal system as set forth in claim 2 wherein the power source further includes a battery connected in parallel with the generator, wherein a diode is connected therebetween.

5. A bicycle turn signal system as set forth in claim 2 wherein the coupling means includes a pair of clamp portions each defined by a portion of a cylinder for allowing the rod of the turn light assembly to be removably coupled to the bicycle.

6. A bicycle turn signal system as set forth in claim 2 wherein the turn light assemblies include a front turn light assembly with the coupling means thereof mounted to a central vertically oriented handle bar post of a bicycle such that the bulbs face forward and a rear turn light assembly with the coupling means thereof mounted to a seat post such that the bulbs face rearward.

7. A bicycle turn signal system comprising:

at least one turn light assembly including a rod adapted for being connected to a bicycle at a central extent thereof, and a pair of bulbs each situated at ends of the rod;

a pair of turn light switch units each adapted for being mounted on handle bars of the bicycle, the turn light switch units each including a momentary push button switch;

said turn light switch units comprising a left turn light switch unit adapted for being mounted on a left side the handle bars adjacent to a left grip and a right turn light switch unit adapted for being mounted on a right side of the handle bars adjacent to a right grip;

a power source;

a control compartment adapted for being mounted to the bicycle, the control compartment including a pair of flashers each connected in series with at least one associated bulb, one of the momentary switches and the power source;

wherein the turn light assemblies each include a pair of hollow disk shaped mounts each having a periphery coupled to ends of the rod such that the mounts reside in a common vertical plane and a circular face with a central aperture and a pair of diametrically opposed threaded bores formed therein, a pair of transparent hemispherical domes each having a pair of conduits formed on diametrically opposed sides thereof whereby the domes are each mounted to the circular face of a respective one of the mounts via screws situated through the conduits and secured to the threaded apertures for defining an interior space in which the bulbs are mounted.

8. A bicycle turn signal system as set forth in claim 7 wherein the power source includes a generator mounted to the bicycle adjacent to a tire thereof for generating an alternating current upon the rotation thereof and further included is a bridge rectifier.

9. A bicycle turn signal system as set forth in claim 7 wherein the power source further includes a battery connected in parallel with the generator, wherein a diode is connected therebetween.

* * * * *